United States Patent
Barret

(10) Patent No.: US 9,862,357 B2
(45) Date of Patent: Jan. 9, 2018

(54) PIVOT LINK FOR A VEHICLE WIPER BLADE

(71) Applicant: Valeo Systèmes d'Essuyage, Le Mesnil Saint Denis (FR)

(72) Inventor: Guillaume Barret, Laps (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 101 days.

(21) Appl. No.: 14/796,203

(22) Filed: Jul. 10, 2015

(65) Prior Publication Data

US 2016/0009253 A1 Jan. 14, 2016

(30) Foreign Application Priority Data

Jul. 11, 2014 (FR) ...................... 14 56725

(51) Int. Cl.
*B60S 1/40* (2006.01)
*B60S 1/38* (2006.01)

(52) U.S. Cl.
CPC ........... *B60S 1/4041* (2013.01); *B60S 1/3862* (2013.01); *B60S 1/4038* (2013.01)

(58) Field of Classification Search
CPC .... B60S 1/3862; B60S 1/4038; B60S 1/4041; B60S 1/524; B60S 1/4074; B60S 1/407; B60S 1/3868; B60S 1/4058
USPC ..................................... 15/250.04
See application file for complete search history.

(56) References Cited

U.S. PATENT DOCUMENTS

| | | | |
|---|---|---|---|
| 2006/0117516 A1* | 6/2006 | Wilms .................. | B60S 1/3849 15/250.32 |
| 2011/0185531 A1* | 8/2011 | Egner-Walter .......... | B60S 1/381 15/250.01 |
| 2013/0097801 A1* | 4/2013 | Schaeuble ............. | B60S 1/3805 15/250.32 |
| 2014/0026349 A1* | 1/2014 | Schaeuble ................ | B60S 1/40 15/250.32 |

FOREIGN PATENT DOCUMENTS

| | | | | |
|---|---|---|---|---|
| DE | 10 2010 025 687 A1 | 1/2012 | | |
| EP | 2607187 A1 | 6/2013 | | |
| EP | 2460700 B1 * | 7/2013 | ............ | B60S 1/3862 |
| EP | 2692597 A2 | 2/2014 | | |

OTHER PUBLICATIONS

Search Report issued in corresponding French Patent Application 1456725 dated Mar. 16, 2015 (6 pages).

* cited by examiner

*Primary Examiner* — Andrew A Horton
(74) *Attorney, Agent, or Firm* — Osha Liang LLP

(57) ABSTRACT

A pivot link for a wiper blade of a vehicle window in a motor car is disclosed. The pivot link includes a substantially cylindrical shaft configured to be attached to a mechanical connector of the blade, and includes fluid-distribution means.

12 Claims, 2 Drawing Sheets

PIVOT LINK FOR A VEHICLE WIPER BLADE

Figure 1:
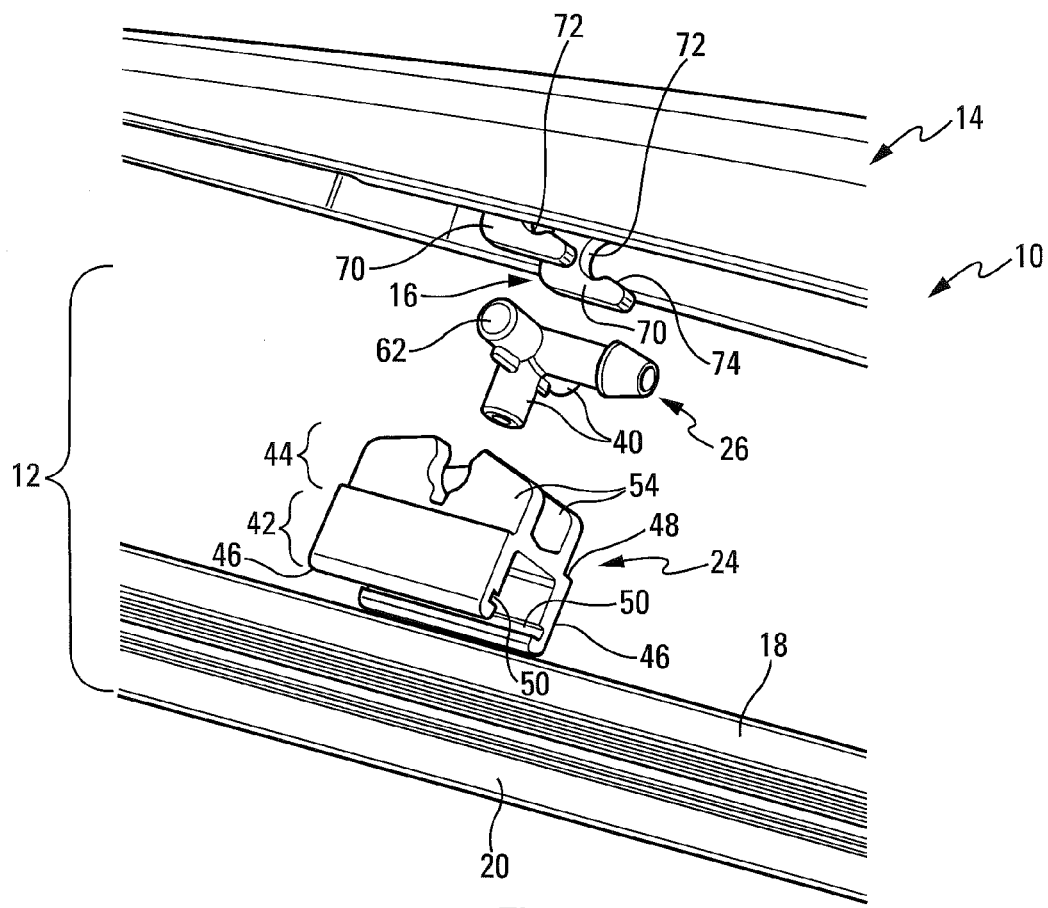

The present invention relates to a pivot link for a wiper blade for a window, in particular a rear window, of a vehicle, for example a motor car. The present invention also relates to an assembly comprising a mechanical connector and such a pivot link, an assembly comprising such a pivot link and a drive arm for a wiper blade for a vehicle window, as well as a wiper blade for a vehicle window.

A motor car is conventionally fitted with screen wipers to wash a window and to ensure that the driver's view of the surrounding environment is not disturbed. These wiper blades usually comprise a drive arm performing an angular to-and-fro movement, and elongated blades carrying squeegees made of an elastic material. These squeegees rub against the window and move the water out of the driver's field of vision. In a conventional version, these blades are articulated clamps that hold the squeegee at several different points, enabling same to bend to fit the curve of the window. In a more recent version, referred to as "flat blade", they comprise a semi-rigid assembly that holds the squeegees along the entire length of same using one or more bending joints enabling the blade to be applied to the window without having to use clamps.

With flat blades, the blade includes a mechanical connector that includes or carries a pivot link designed to cooperate with the arm or element carried by the arm to enable the blade to pivot in relation to the arm, for example to facilitate replacement of worn squeegees.

In the current state of the art, a pivot link for a wiper blade is simply formed by a cylindrical shaft, that is normally received in a cylindrical seat of the connector.

Furthermore, it is known to fit a wiper blade with means for projecting screen wash onto the window to be wiped. These projection means are supplied with screen wash by fluid distribution means, which are generally formed inside the connector.

The present invention proposes an improvement on this technology, notably simplifying the manufacture of a connector for a wiper blade fitted with fluid-projection means, in particular for screen wash.

For this purpose, the invention proposes a pivot link for a wiper blade of a vehicle window, in particular in a motor car, the pivot link comprising a substantially cylindrical shaft designed to be attached to a mechanical connector of said blade, characterized in that it includes fluid distribution means, and characterized in that the pivot link includes at least one anti-rotation member designed to cooperate with said connector in order to prevent the pivot link from rotating in relation to the connector.

The invention also proposes fitting the pivot link with fluid distribution means, thereby providing the pivot link with an additional (fluid distribution) function. The mechanical connector can therefore be designed without fluid distribution means, thereby simplifying the manufacture of same. And it is advantageous that the pivot link is made rotationally coupled with the connector, so that fluid distribution means can be easily implanted in the vicinity of the connector to allow the distribution towards the blade.

The pivot link may include one or more of the features below, individually or in combination:
the pivot link is removable, i.e. it is attached to the mechanical connector and can be removed from same without breaking,
the pivot link is made from a single part,
said fluid distribution means are linked to a median portion of said substantially cylindrical shaft,
said fluid distribution means include at least one fluid inlet tube and at least one fluid outlet tube,
the axes of the tubes are substantially perpendicular to one another and/or to said substantially cylindrical shaft,
said axes of the tubes extend in a plane substantially perpendicular to said substantially cylindrical shaft and pass substantially through the middle of said substantially cylindrical shaft,
the pivot link includes at least one anti-rotation rib, this rib extending preferably on the substantially cylindrical shaft, substantially parallel to same, and
said at least one rib is linked to said fluid distribution means.

The present invention also relates to an assembly comprising a mechanical connector and a pivot link as described above for a wiper blade of a vehicle window, in particular in a motor car, the connector comprising attachment means for a squeegee of said blade or for a supporting member for said squeegee of said blade.

The assembly may include one or more of the features below, individually or in combination:
the connector includes at least one seat for receiving the substantially cylindrical shaft of the pivot link, preferably by elastic snap-fitting,
the assembly includes anti-rotation means designed to prevent the pivot link from rotating in relation to the connector,
the connector includes at least one notch for receiving an anti-rotation rib of the pivot link, and
the connector includes at least one hole traversed by a tube of the fluid distribution means of the pivot link.

The present invention also relates to a wiper blade of a vehicle window, in particular in a motor car, including a pivot link or an assembly as described above.

The present invention finally relates to an assembly comprising a pivot link as described above and a drive arm of a wiper blade of a vehicle window, in particular in a motor car, the arm having at least one and preferably two legs, the or each leg having a seat for rotatably receiving the substantially cylindrical shaft of the pivot link, preferably by elastic snap-fitting.

Figures 2, 3:
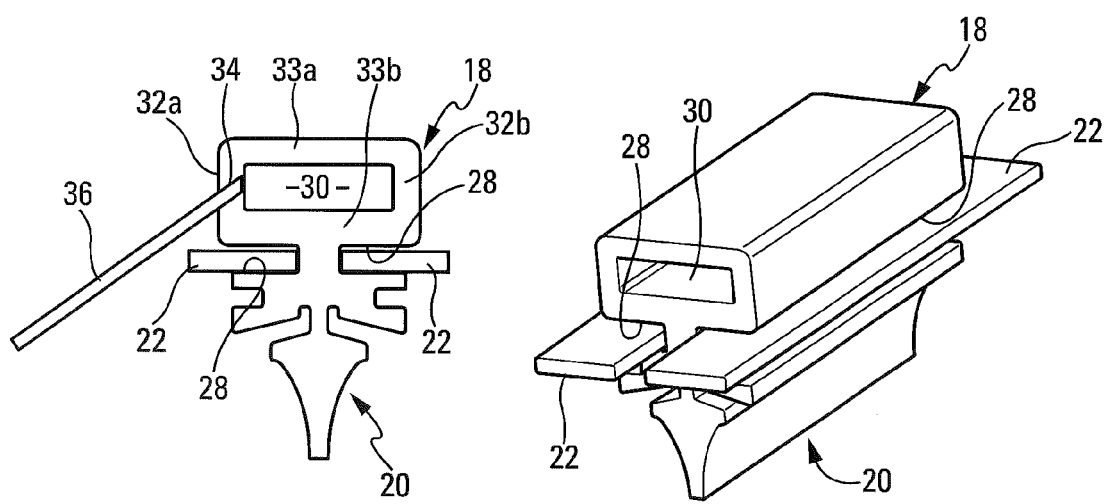
Figure 4:
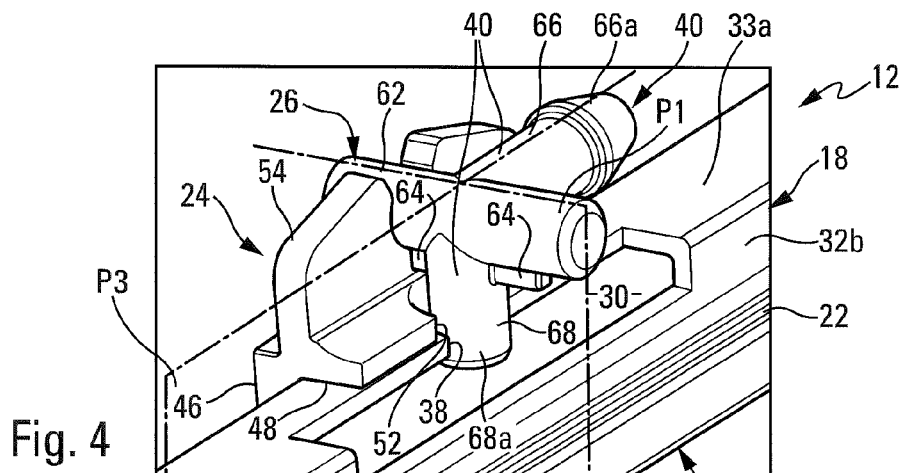
Figure 5:
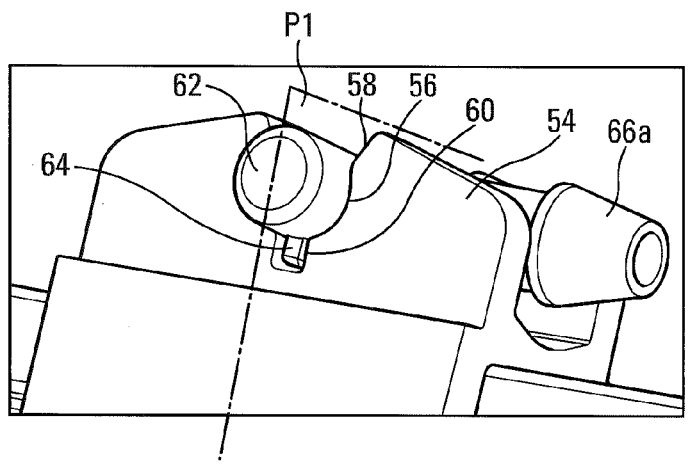
Figure 6:
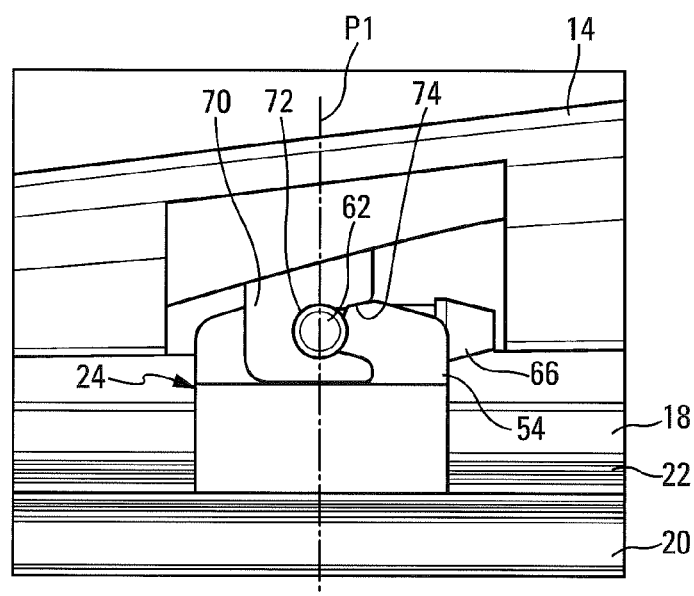

The invention can be better understood from, and other details, features and advantages of the invention are set out in, the description below, given by way of non-limiting example and with reference to the attached drawings, in which:

FIG. 1 is a partial schematic exploded perspective view of a wiper of a vehicle window, according to one embodiment of the invention, FIGS. 2 and 3 are schematic cross-section and perspective views respectively of a squeegee and stiffening joints of the wiper blade in FIG. 1, FIGS. 4 and 5 are partial perspective schematic views of the wiper blade in FIG. 1 showing the assembly including the mechanical connector and the pivot link of said blade, and FIG. 6 is a partial perspective schematic view of the wiper in FIG. 1.

It should be noted that the figures show the invention in detail to enable the invention to be carried out, and these figures may be understood to better define the invention where appropriate.

In the description below, the terms longitudinal and lateral relate to the orientation of the wiper blade according to the invention. The longitudinal direction corresponds to the main axis of the blade along which it extends, while the lateral orientations correspond to the convergent straight lines, i.e. lines crossing the longitudinal direction, notably perpendicular to the longitudinal axis of the wiper in the plane of rotation of same. For the longitudinal directions, the terms external and internal are understood in relation to the axis of rotation of the blade, the term internal corresponding to the part of the blade located on the side of said axis of rotation. Finally, the directions referred to as upper and lower correspond to orientations perpendicular to the plane of rotation of the wiper, the term lower covering the plane of the window to be wiped.

FIGS. 1 to 6 illustrate an embodiment of the invention and show a wiper 10 that is particularly but not exclusively suited to wiping a rear window of a motor car.

The wiper 10 essentially comprises two elements: a longitudinal blade 12 and a longitudinal drive arm 14 for the blade. The arm 14, shown in FIGS. 1 and 6, extends along at least one portion of the blade to cover and protect same. It includes a longitudinal extremity (not shown) of attachment means to a shaft of an electric drive motor for the arm, and it also includes means 16 for attaching the blade, which are described in greater detail below.

The blade 12 comprises a longitudinal body 18 carrying a squeegee 20, at least one and in this case two stiffening joints 22, a mechanical connector 24 fitted with a pivot link 26 for connecting the blade 12 to the arm 14, and end pieces (not shown).

The squeegee 20 is made of rubber and is designed to rub against the window of the vehicle to move the water out of the driver's field of vision. The body 18 has longitudinal lateral slots 28 in which are seated respectively the two joints 22 (FIGS. 2 and 3). These joints 22 are parallel and coplanar and they stiffen the squeegee 20, facilitating the application of same to the window. The body 18 and the squeegee 20 are in this case made from a single part.

The body 18 is tubular and has a substantially rectangular section. The body 18 has two substantially parallel longitudinal lateral walls 32a, 32b that are connected together by two substantially parallel upper and lower longitudinal walls, respectively 33a and 33b.

The walls of the body 18 form an internal longitudinal flow cavity 30 for screen wash. At least one of the lateral walls 32a of the body has holes 34 for the projection of screen wash 36 onto the window to be wiped.

As shown in FIG. 4 the upper wall 33a of the body 18 (which has been cut away here for the sake of clarity) has a through hole 38 for mounting fluid distribution means 40, which are described in greater detail below. These distribution means 40 supply screen wash from the cavity 30 of the body 18.

Each end piece is fitted onto a longitudinal extremity of the body 18 and onto the corresponding longitudinal extremities of the joints 22, and is designed to hold these latter in the slots 28 of the body 18.

The connector 24 essentially comprises two parts: lower attachment means 42 to the body 18 and upper attachment means 44 for the pivot link 26.

The cross-section of the lower attachment means 42 is substantially inverted-U shaped with two substantially parallel longitudinal lateral walls 46 that are separated from one another and that of connected together at the upper extremities of same by an upper wall 48. The lateral walls 46 are designed to extend on either side of a portion of the body 18 and each one has a longitudinal slot 50 receiving a longitudinal end portion of a joint 22. Inserting the joints 22 into the slots 28 of the body 18 and the slots 50 of the connector 24 attaches the connector to the body.

The upper wall 48 of the connector 24 is substantially flat, extends above the upper wall 33a of the body and is substantially parallel to same. In the assembled position, the walls 48, 33a may be in contact.

The wall 48 has a through hole 52 that is aligned with the hole of the body 18 for the fluid distribution means 40. The diameter of the hole 52 is in this case greater than the diameter of the hole 38.

The cross-section of the upper attachment means 44 is substantially U-shaped with two substantially parallel longitudinal lateral legs 54 that are separated from one another and that of connected together at the lower extremities of same by the upper wall 48. The lateral legs 54 are designed to extend on either side of the upper opening of the hole 52 of the upper wall 48.

Each leg 54 has a seat 56 for receiving a portion of the pivot link 26, in this case by elastic snap-fitting (FIG. 5). Each seat 56 has a generally cylindrical shape. The seats 56 are coaxial. Each seat 56 opens onto an upper longitudinal edge of the corresponding leg 54 by means of a radial opening 58 (in this case opened upwards). Furthermore, each seat 56 has a substantially radial notch 60. The notch 60 extends substantially radially and is diametrically opposed to the opening 58.

The substantially vertical transverse plane P1 passes through the middle of the notches 60, the seats 56 and the openings 58, as well as passing through the middle of the hole 52.

The pivot link 26 essentially comprises two parts: a substantially cylindrical transverse shaft 62 and the aforementioned fluid distribution means 40.

The shaft 62 is designed to elastically snap fit into the seats 56 of the connector. It is longer than the width or transverse dimension of the upper attachment means 44 of the connector 24 such that the longitudinal end portions of the shaft 62 project beyond the external lateral faces of the legs 54 of the connector, as shown notably in FIG. 5.

Anti-rotation ribs 64 project from the shaft 62 to cooperate with the notches 60 of the connector. The ribs 64 are oriented longitudinally and extend downwards from the shaft 62. One of the longitudinal extremities of same is attached to the distribution means 40 and the other longitudinal extremity of same is free and intended to fit into a notch 60. The ribs 64 butt against the edges of the notches 60 to prevent rotation of the shaft 62 in the seats 56, and therefore rotation of the pivot link 26 in relation to the connector 24.

In the assembled position shown in FIG. 5, the free extremity of each rib 64 is substantially aligned with the external lateral face of the corresponding leg 54 of the connector 24.

In this case, the fluid distribution means 40 include a fluid inlet tube 66 and a fluid outlet tubes 68 (screen wash). The tubes 66, 68 are tubular and substantially cylindrical. They each have a rectilinear orientation. The axes of the tubes 66, 68 are substantially perpendicular. They are also substantially perpendicular to the shaft 62. They extend in a plane P3 passing substantially through the middle of the shaft 62.

The inlet tube 66 is in this case substantially horizontal in the assembled position and has a longitudinal extremity connected by means of the shaft 62 to an upper longitudinal extremity of the outlet tube 68. The longitudinal end portion 66a of the inlet tube 66, opposite the shaft 62, is designed to fit into an extremity of a hose and is in this case designed to facilitate and maintain this fitting. The lower longitudinal end portion 68a of the outlet tube 68 is designed to traverse, with clearance, the hole 52 of the connector 24 and to fit with no play or to be clamped in the hole 38 of the body 18 (FIG. 4).

The tubes 66, 68 are in this case connected together by a medium portion of the shaft 62 that includes an internal passage (not shown) providing a fluid connection between the pipes. In the assembled position, the tubes 66, 68 extend between the lateral legs 54 of the connector 24.

The pivot link including the tubes 66, 68, the ribs 64 and the shaft 62 is in this case formed from a single part.

FIGS. 1 and 6 show the attachment and articulation means 16 of the arm 14 to the blade 12, and in particular to the pivot link 26 carried by the blade.

In the example shown, the arm 14 includes to lower lateral legs 70 each having a seat 72 for receiving a longitudinal end portion of the shaft 62, in this case by elastic snap-fitting. The legs 70 are substantially parallel and are oriented substantially longitudinally. They are separated transversely from one another by a distance greater than the width or transverse dimension of the attachment means 44 of the connector 24, but less than the length of the shaft 62, thereby enabling the aforementioned assembly.

The diameter of the seats 72 is slightly greater than the diameter of the shaft 62 to enable same to rotate, thereby enabling the blade to pivot in relation to the arm.

The seat 72 of each leg 70 is in this case linked to a substantially radial opening 74 (in relation to the transverse axis of the seat) that in this case opens onto the internal edge of the leg 70. The end portions of the shaft 62 are fitted into the seats 72 passing through the openings 74. As such, the blade 12 is mounted on the arm 14 by moving the blade in translation in relation to the arm in a direction parallel to the longitudinal axis of the blade until the shaft 62 is elastically snap fitted into the seats 72 of the legs 70. This makes it possible to provide two different directions for assembling the pivot link 26 on the connector 24 and for mounting the arm on the blade, thereby obviating the risk that disconnection of the arm from the blade by longitudinal translational movement of one in relation to the other could accidentally disassemble the pivot link 26 from the connector 24. In other words, the openings 74 through which the pivot link 26 is inserted in the arm 14 are oriented substantially perpendicular to both the direction of the anti-rotation rib 64 and the orientation of the notch 60 wherein the shaft 62 is inserted.

In a variant, the seat 72 of each leg 70 may be linked to an opening, in this case opening onto the lower edge of the leg, such that the blade 12 is mounted on the arm 14 by moving the blade in translation in relation to the arm in a direction substantially parallel to the axis of the tube 68 until the shaft 62 is elastically snap fitted into the seats 72 of the legs 70. The force required to remove and disassemble the blade from the arm is then preferably less than the force required to disassemble the pivot link from the connector, such that separating the blade from the arm by pulling one away from the other in a direction parallel to the axis of the tube 68 does not necessarily result in disassembly of the pivot link 26 from the connector 24.

The wiper 10 according to the invention may be assembled as follows: The connector 24 is arranged on the body 18 such that the lower lateral walls 46 of same extend on either side of the body 18 and the slots 50 of same are located facing the slots 28 of the body. The joints 22 are fitted into the slots 28, 50 by sliding same longitudinally, which holds and attaches the connector 24 in relation to the body 18. The end pieces are assembled to hold the assembly together. The pivot link 26 is attached to the connector 24 by arranging same as illustrated in FIG. 1 and moving same downwards in translation in a direction parallel to the axis of the holes 52, 38 until the outlet tube 68 enters the hole 38 of the body 18 and the shaft 62 is seated in the seats 56 of the connector. Finally, the blade 12 is attached to the arm 14 as explained above. In such an assembly, the pivot link 26 is rotationally coupled to the connector 24.

The invention claimed is:

1. A pivot link and a mechanical connector for a blade of a wiper of a vehicle window in a motor car, the pivot link comprising:
   a substantially cylindrical shaft designed to be attached to the mechanical connector of said blade;
   fluid distribution means that includes a fluid inlet tube and a fluid outlet tube; and
   at least one anti-rotation member designed to cooperate with said mechanical connector in order to prevent the pivot link from rotating in relation to the mechanical connector,
   wherein the fluid inlet tube is substantially perpendicular to the cylindrical shaft and the fluid outlet tube, and the fluid outlet tube is substantially perpendicular to the cylindrical shaft, and
   wherein the pivot link is pivotally connected to a drive arm.

2. The pivot link according to claim 1, wherein the pivot link is formed from a single part.

3. The pivot link according to claim 1, wherein said fluid distribution means is linked to a median portion of said substantially cylindrical shaft.

4. The pivot link according to claim 1, wherein axes of the tubes extend in a plane substantially perpendicular to said substantially cylindrical shaft and pass substantially through the middle of said substantially cylindrical shaft.

5. The pivot link according to claim 4, wherein the at least one anti-rotation member comprises at least one anti-rotation rib extending on the substantially cylindrical shaft, and being substantially parallel to the substantially cylindrical shaft.

6. The pivot link according to claim 5, wherein said at least one rib is linked to said fluid distribution means.

7. A blade of a wiper of a vehicle window in a motor car, including the pivot link and the drive arm according to claim 1.

8. An assembly comprising:
   a pivot link for a blade of a wiper of a vehicle window in a motor car,
   a mechanical connector comprising attachment means for attaching a squeegee of said blade or for attaching a supporting member for said squeegee of said blade,
   wherein at least one anti-rotation member of the pivot link projects from a substantially cylindrical shaft of the pivot link, wherein the at least one anti-rotation member cooperates with at least one notch of the mechanical connector,
   wherein a fluid inlet tube is substantially perpendicular to the cylindrical shaft and a fluid outlet tube, and the fluid outlet tube is substantially perpendicular to the cylindrical shaft, and
   wherein the pivot link is pivotally connected to a drive arm.

9. The assembly according to claim 8, wherein the mechanical connector includes at least one seat that receives the substantially cylindrical shaft of the pivot link by elastic snap-fitting.

10. The assembly according to claim 8, further comprising the at least one anti-rotation member that prevents the pivot link from rotating in relation to the mechanical connector.

11. The assembly according to claim 8, wherein the mechanical connector includes at least one hole traversed by the fluid inlet tube or the fluid outlet tube of a fluid distribution means of the pivot link.

12. An assembly comprising:
- a pivot link comprising fluid distribution means with a fluid inlet tube and a fluid outlet tube; and
- a drive arm of a blade of a wiper of a vehicle window in a motor car, the arm having at least one leg, the at least one leg having a seat for rotatably receiving the substantially cylindrical shaft of the pivot link by elastic snap-fitting,
- wherein the fluid inlet tube is substantially perpendicular to a cylindrical shaft of the pivot link and the fluid outlet tube, and the fluid outlet tube is substantially perpendicular to the cylindrical shaft, and
- wherein the pivot link is pivotally connected to the drive arm.

\* \* \* \* \*